United States Patent
Graybeal et al.

(10) Patent No.: US 11,936,453 B2
(45) Date of Patent: Mar. 19, 2024

(54) FORWARD PREDICTIVE PRECODED MIMO

(71) Applicant: Cisco Technology, Inc., San Jose, CA (US)

(72) Inventors: John Martin Graybeal, Califon, NJ (US); Paul Anthony Polakos, Marlboro, NJ (US); Robert Edward Liston, Menlo Park, CA (US); Wai-Tian Tan, Los Altos, CA (US); Xiaoqing Zhu, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 107 days.

(21) Appl. No.: 17/165,368

(22) Filed: Feb. 2, 2021

(65) Prior Publication Data
US 2022/0247465 A1    Aug. 4, 2022

(51) Int. Cl.
| | |
|---|---|
| H04B 7/06 | (2006.01) |
| H04B 7/0452 | (2017.01) |
| H04B 7/0456 | (2017.01) |
| H04L 25/02 | (2006.01) |

(52) U.S. Cl.
CPC ......... H04B 7/0626 (2013.01); H04B 7/0452 (2013.01); H04B 7/0456 (2013.01); H04L 25/0226 (2013.01)

(58) Field of Classification Search
None
See application file for complete search history.

(56) References Cited

U.S. PATENT DOCUMENTS

| | | | |
|---|---|---|---|
| 9,425,881 B2 * | 8/2016 | Kim ..................... | H04B 7/0639 |
| 9,647,736 B1 * | 5/2017 | Schelstraete ......... | H04B 7/0456 |

(Continued)

FOREIGN PATENT DOCUMENTS

| | | |
|---|---|---|
| WO | 2019138156 A1 | 7/2019 |
| WO | WO-2021228353 A1 * | 11/2021 |

OTHER PUBLICATIONS

T.R. Ramya et al., On Using Channel Prediction in Adaptive Beamforming Systems, Conference: Proceedings of the Second International Conference on Communication System Software and Middleware (COMSWARE 2007), Jan. 7-12, 2007, Bangalore, India, 6 pages.

(Continued)

*Primary Examiner* — Kodzovi Acolatse
*Assistant Examiner* — Anindita Sen
(74) *Attorney, Agent, or Firm* — Merchant & Gould P.C.

(57) ABSTRACT

Multi-User Multiple Input, Multiple Output (MU-MIMO) data transmissions are provided with a forward-predictive precoding matrix to mitigate the effects of a change in a state of a communication channel. First and second soundings are performed, at first and second times, to a receive antenna over a channel and, responsive to each of the soundings, first and second Channel State Information (CSI) are received. Based on the first and second CSI, a change in a state of the channel over a time period between the first and second time is determined. Based on the change in the state of the channel, a forward-predictive channel state matrix and/or a forward-predictive precoding matrix are determined that reflect a state of the channel at a future time and that are consistent with the determined change in the state over the time period. The forward-predictive precoding matrix is applied to a data transmission.

20 Claims, 8 Drawing Sheets

(56) References Cited

U.S. PATENT DOCUMENTS

| | | | |
|---|---|---|---|
| 2006/0165008 A1* | 7/2006 | Li | H04L 1/0032 |
| | | | 370/252 |
| 2011/0134859 A1 | 6/2011 | Li et al. | |
| 2011/0141927 A1* | 6/2011 | Luo | H04B 7/0413 |
| | | | 370/252 |
| 2012/0045003 A1* | 2/2012 | Li | H04B 7/0478 |
| | | | 375/260 |
| 2013/0170445 A1 | 7/2013 | Khojastepour et al. | |
| 2015/0078470 A1 | 3/2015 | Etkin et al. | |
| 2016/0113010 A1* | 4/2016 | Asplund | H04W 72/23 |
| | | | 370/280 |
| 2018/0323825 A1* | 11/2018 | Cioffi | H04B 3/52 |
| 2018/0368019 A1* | 12/2018 | Nammi | H04L 25/0204 |
| 2019/0260429 A1* | 8/2019 | Xu | H04B 17/309 |
| 2021/0028962 A1* | 1/2021 | Schelstraete | H04L 25/0224 |
| 2021/0067212 A1* | 3/2021 | Pierrugues | H04B 17/3913 |
| 2021/0226674 A1* | 7/2021 | Ramireddy | H04B 7/0417 |
| 2021/0399862 A1* | 12/2021 | Bagheri | H04L 5/0041 |

OTHER PUBLICATIONS

Joao P. Leite et al., Channel Prediction on the Downlink of Precoded Multiuser MIMO OFDM Systems Using the Set-Membership Affine Projection Filtering, Conference: Proceedings of the 74th IEEE Vehicular Technology Conference, VTC Fall 2011, Sep. 5-8, 2011, San Francisco, CA, USA, 5 pages.

* cited by examiner

FORWARD PREDICTIVE PRECODED MIMO

TECHNICAL FIELD

The present disclosure relates generally to wireless networking.

BACKGROUND

In computer networking, a wireless Access Point (AP) is a networking hardware device that allows a Wi-Fi compatible client to connect to a wired network and to other clients. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

An AP connects to a wired network, then provides Radio Frequency (RF) links (e.g., channels) for other radio devices, such as clients associated with that AP, to reach that wired network. Most APs support the connection of multiple wireless devices to one wired connection. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
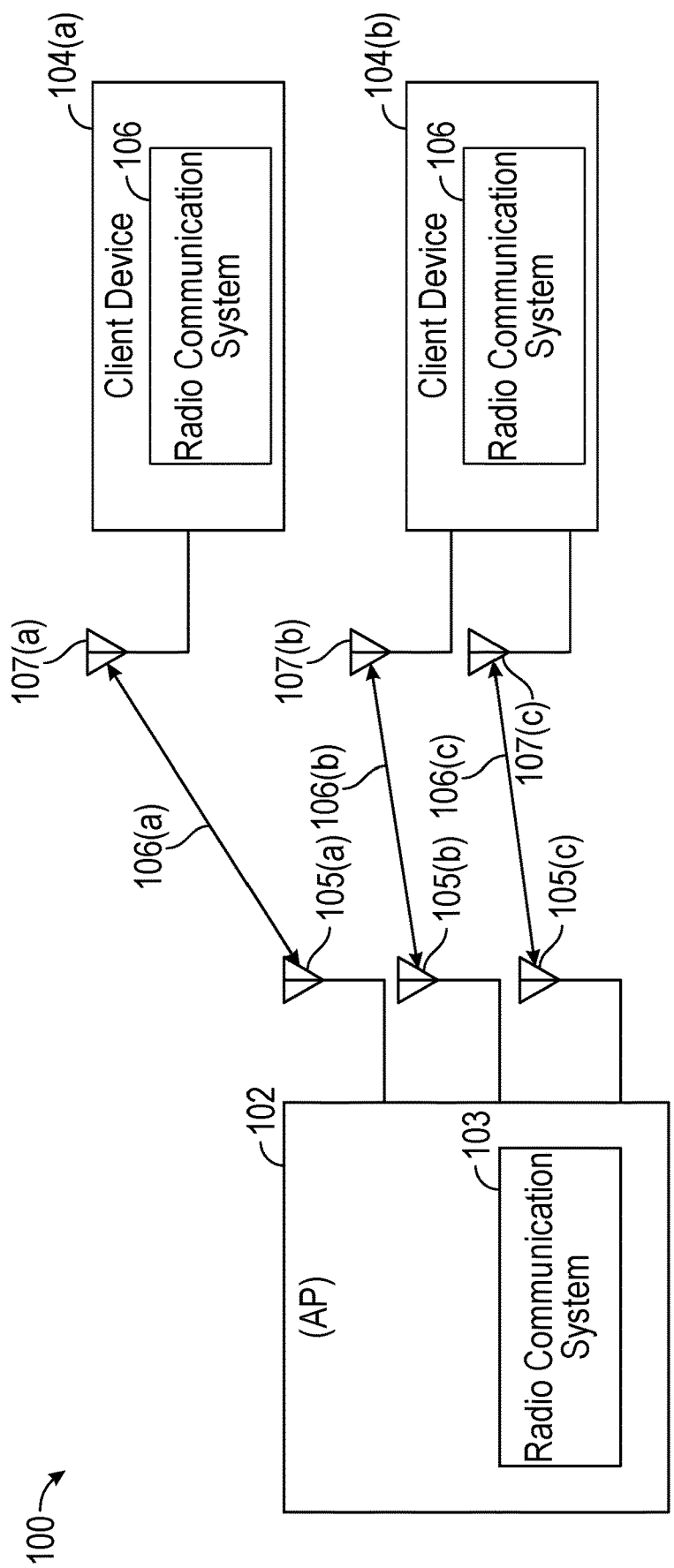
FIG. 1 is a block diagram of a wireless network.

Multi-User Multiple Input, Multiple Output (MU-MIMO) data transmissions are provided with a forward-predictive precoding matrix to mitigate the effects of a change in a state of a communication channel. First and second soundings are performed, at first and second times, to a receive antenna over a channel and, responsive to each of the soundings, first and second Channel State Information (CSI) are received. Based on the first and second CSI, a change in a state of the channel over a time period between the first and second time is determined. Based on the change in the state of the channel, a forward-predictive channel state matrix and/or a forward-predictive precoding matrix are determined that reflect a state of the channel at a future time and that are consistent with the determined change in the state over the time period. The forward-predictive precoding matrix is applied to a data transmission.

Both the foregoing overview and the following example embodiments are examples and explanatory only and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Institute of Electrical and Electronics Engineers (IEEE) 802.11 is part of the IEEE 802 Local Area Network (LAN) protocols. Channel sounding, an integral part of IEEE 802.11, is required for Multi-User Multiple Input Multiple, Output (MU-MIMO) applications. During channel sounding, an Access Point (AP) transmits a request to a group of receive antennas of one or more client devices and the respective client device returns Channel State Information (CSI) to the AP for each receive antenna in the group. The CSI is used by the AP to determine a precoding matrix.

MU-M IMO transmissions include the precoding matrix to direct a data stream from the AP to one particular receive antenna of the group. The precoding matrix applies a set of complex weights to the data stream such that the data stream appears at only the particular receive antenna and cancels the data stream at the locations of the other receive antennas in the group. For each subsequent data transmission, a sounding for new CSI is obtained by the AP from the group of receive antennas and is used by the AP to determine a new precoding matrix to apply to the subsequent data transmission.

The technique of sounding to obtain new CSI for each new data transmission is suitable in the context of an unaffected communication channel. However, in instances where the state of the communication channel is affected by, for example, a moving receive antenna, a moving transmit antenna, motion in the environment surrounding the communication channel (e.g., people moving around, regular motion of a metal fan in a factory), or time-dependent gradual changes in scattering environment from reasons other than motion (e.g., due to changes in electromagnetic properties such as photochromic windows, changes in conductivity, etc.) the interference cancellation enabled by the precoding matrix may be affected causing a Signal-to-Interference Ratio (SIR) to degrade.

The present disclosure provides technical solutions that may be used in wireless networks to precode MU-MIMO data transmissions to mitigate the effect of changes in channel state during data transmission. Mitigating the effect of changes in channel state through use of a forward-predictive precoding matrix provides a reduction in SIR degradation.

Embodiments of the disclosure utilize at least two instances of CSI obtained through first and second soundings of a communication channel between a transmit antenna of a device, such as an AP, and a receive antenna of a client device to determine a forward-predictive precoding matrix for MU-MIMO data transmission. The information contained in the at least two instances of CSI are used to predict a change in the state of the communication channel at a future point in time. The predictive results are incorporated into the forward-predictive precoding matrix for a subsequent MU-MIMO data transmission enhancing the likelihood that the MU-MIMO data transmission will arrive at the receive antenna with reduced or no SIR degradation.

It should be noted that in the context of the description of the example embodiments provided herein the term "CSI" is to be interpreted to be any type of data or information that is representative of a channel state and, therefore, is not limited to a CSI matrix.

Provided below is a specific example of determining a forward-predictive precoding matrix to mitigate the effect of changes in channel state within the context of a static transmit antenna of an AP and a moving receive antenna of a client device. However, it should be appreciated that the stages of determining the forward-predictive precoding matrix are equally applicable to contexts where changes in the channel state are caused by other factors as noted herein.

FIG. 1 provides a block diagram of an exemplary wireless network 100 for MU-MIMO data transmission. As shown, wireless network 100 includes an AP 102 and a plurality of client devices, collectively referred to as client devices 104 and individually referred to as client device 104(a) and client device 104(b). AP 102 may be currently associated with one or more of client devices 104.

An exemplary AP 102 includes an integrated radio communication system 103 that includes a plurality of radios and antennas such as antenna 105(a), antenna 105(b) and antenna 105(c). Likewise, each client device 104 includes an integrated radio communication system 106 having a plurality of radios and one or more antennas such as antenna 107(a) associated with client device 104(a) and antennas 107(b), antenna 107(c) associated with client device 104(b). Each radio communication system 103, 106 is operable to communicate on one or more wireless links or channels. Illustrated are exemplary wireless links established according to the 802.11 wireless protocol. The channels include a channel 106(a) between antenna 105(a) of AP 102 and antenna 107(a) of client device 104(a), as well as a channel 106(b) between antenna 105(b) of AP 102 and antenna 107(b) of client device 104(b) and a channel 106(c) between antenna 105(c) of AP 102 and antenna 107(c) of client device 104(b). AP 102 and at least client device 104(b) may be multi-link capable devices enabling the establishment of communication over the at least two channels 106(b) and 106(c).

Wireless network 100 is not limited to the illustrated configuration but may include a plurality of APs 102 with each including a greater or fewer number of antennas 105. Further, the illustrated configuration may include a greater or fewer number of client devices 104 with a greater or fewer number of antennas 107 as well as a greater or fewer number of channels 106. For example, antenna 105(a) may have a channel established with a group of different receive antennas of one or more client devices. AP 102 and client devices 104 can use the respective integrated radio communication systems 103, 106 to establish communication over wireless network 100 (e.g., a Wireless Local Area Network (WLAN)).

AP 102 may be a networking hardware device that enables other devices, such as client device 104, to connect to network 100. As an example, AP 102 can be configured with a multi-radio software controller for use with Long Term Evolution (LTE), Wireless Fidelity (Wi-Fi), Worldwide Interoperability for Microwave Access (WiMAX), Global System for Mobile Communications (GSM), Code Division Multiple Access (CDMA), Wideband Code Division Multiple Access (WCDMA), etc. that includes N (e.g., 2, 4, 8, 16, etc.) independent 2×2 transceivers, N independent two channel receivers or sniffers, a radio frequency band from about 70 Megahertz (MHz) to about 6 Gigahertz (GHz), and a tunable channel bandwidth.

In other embodiments of the disclosure, rather than APs, devices may be used that may be connected to a cellular network that may communicate directly and wirelessly with user devices (e.g., client device 104) to provide access to wireless network 100 (e.g., Internet access). For example, these devices may comprise, but are not limited to, eNodeBs (eNBs) or gNodeBs (gNBs). A cellular network may comprise, but is not limited to, an LTE broadband cellular network, a Fourth Generation (4G) broadband cellular network, or a Fifth Generation (5G) broadband cellular network, operated by a service provider. Notwithstanding, embodiments of the disclosure may use wireless communication protocols using, for example, Wi-Fi technologies, cellular networks, or any other type of wireless communications.

Client device 104 may comprise, but is not limited to, a phone, a smartphone, a digital camera, a tablet device, a laptop computer, a personal computer, a mobile device, a sensor, an Internet-of-Things (IoTs) device, a cellular base station, a telephone, a remote control device, a set-top box, a digital video recorder, a cable modem, a network computer, a mainframe, a router, or any other similar microcomputer-based device capable of accessing and using a Wi-Fi network.

Components of wireless network 100 (e.g., AP 102 and client devices 104) may be practiced in hardware and/or in software (including firmware, resident software, microcode, etc.) or in any other circuits or systems. The elements of wireless network 100 may be practiced in electrical circuits comprising discrete electronic elements, packaged or integrated electronic chips containing logic gates, a circuit utilizing a microprocessor, or on a single chip containing electronic elements, radio elements, or microprocessors. Furthermore, the components of wireless network 100 may also be practiced using other technologies capable of performing logical operations such as, for example, AND, OR, and NOT, including but not limited to, mechanical, optical, fluidic, and quantum technologies. As described in greater detail below with respect to FIG. 7, aspects of wireless network 100 may be practiced in a computing device 700.

Figure 2:
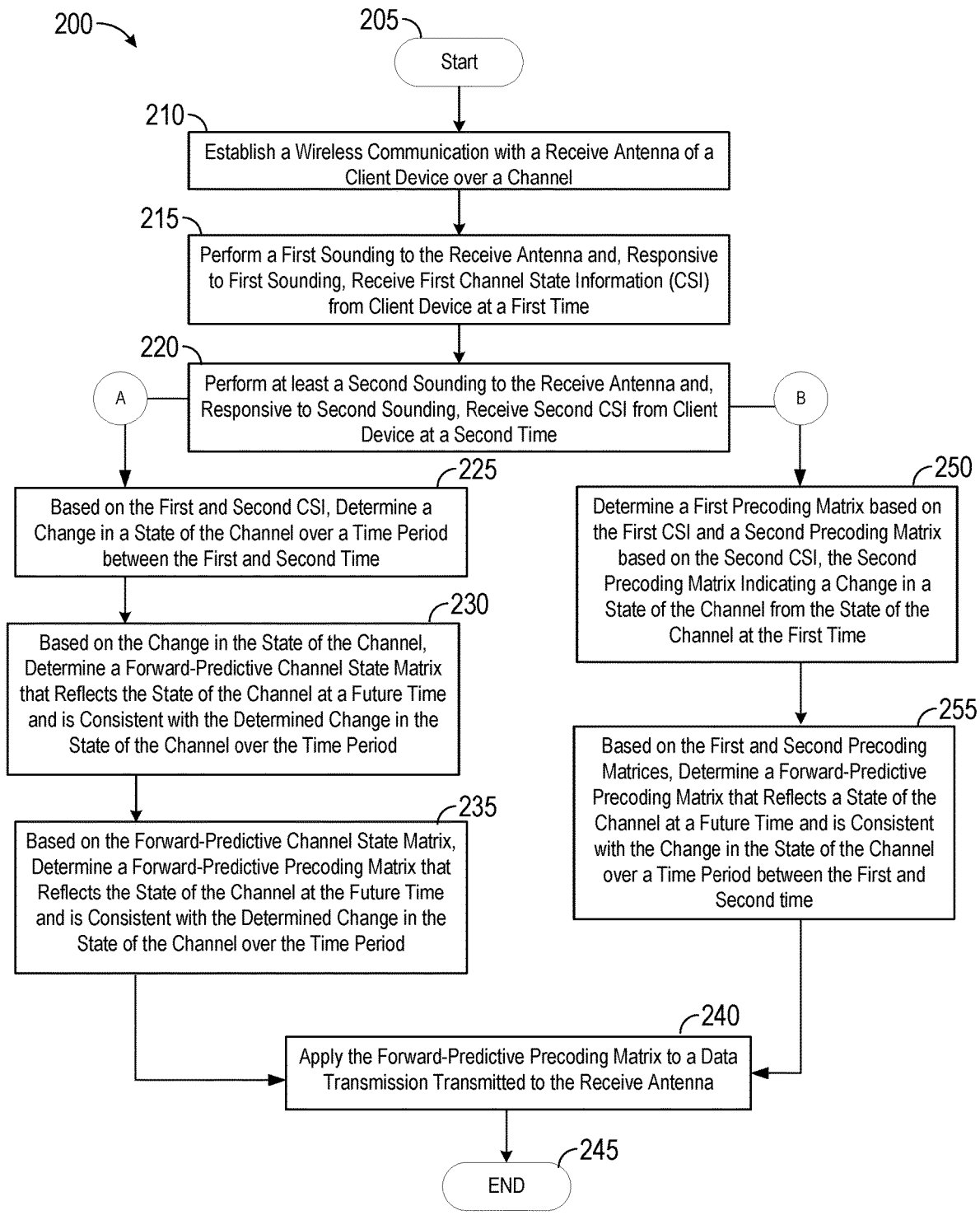
FIG. 2 is a flow chart of a method for future-predictive precoding MU-MIMO data transmissions in a wireless network.

FIG. 2 is a flow chart setting forth the general stages involved in a method 200 for future-predictive pre-coding MU-MIMO data transmissions in a wireless network, such as wireless network 100 of FIG. 1. Method 200 starts at block 205 and proceeds to stage 210 where AP 102 utilizes its radio communication system 103 to establish communication over channel 106(a) with receive antenna 107(a) of client device 104(a). At stage 215, AP 102 performs a first sounding from antenna 105(a) to receive antenna 107(a) of client device 104(a) and client device 104(a) replies via receive antenna 107(a) with first CSI to antenna 105(a) at AP 102 at a first time. At stage 220, AP 102 performs at least a subsequent second sounding from antenna 105(a) to the same receive antenna 107(a) of client device 104(a) and client device 104(a) replies via receive antenna 107(a) with second CSI to antenna 105(a) at AP 102 at a second time. Additional instances of sounding from AP 102 via antenna 105(a) to the same receive antenna 107(a) of client device 104(a) and replies from client device 104(a) via receive antenna 107(a) to antenna 105(a) of AP 102 may also occur and be utilized in subsequent stages.

Then, in one embodiment that follows path A of method 200, at stage 225 the AP 102 determines, based on the first and second CSI, that a change in state of the channel 106(a) has occurred over a time period between the first and second time, e.g., receive antenna 107(a) has changed location over the time period. At stage 230, based on the change in state of the channel 106(a), the AP 102 determines a forward-predictive channel state matrix that reflects the state of the channel 106(a) at a future time and that is consistent with the determined change in the state of the channel 106(a) over the time period.

At stage 235, based on the forward-predictive channel state matrix, the AP 102 determines a forward-predictive precoding matrix that reflects the state of the channel 106(a) at the future time and that is consistent with the determined change in the state of channel 106(a) over the time period. For example, in the instance of a changed location of the receive antenna 107(a), the AP 102 directs a subsequent data transmission over channel 106(a) to receive antenna 107(a) using the forward-predictive precoding matrix which presents the subsequent data transmission at a future time and location that reflects the predicted change in the state of the channel.

To determine that the receive antenna 107(a) has changed location over time, AP 102 can calculate a first order derivative using the first and second CSI and the information obtained from the first order derivative can be used to update a channel matrix (e.g., H-Matrix) as well as determine the forward-predictive precoding matrix. The deterministic derivative process accounts for CSI channel state dependency, e.g., in the specific example, the derivative process accounts for CSI location dependence in the event that the location of receive antenna 107(a) has changed. In certain embodiments, dependent upon the nature of the sounding feedback, the forward-predictive precoding matrix can be determined without being dependent upon an update of the channel matrix.

The information required to determine the forward-predictive precoding matrix is obtained by performing extrapolation on the first derivatives of successive sounding measurements, e.g., successive CSI. The extrapolation provides a representation of the change in the state of channel 106(a) over time. In the specific example, the extrapolation provides a representation of the change in location of the receive antenna 107(a) over time (e.g., the change in distance as well as the change in direction of the receive antenna over the difference in the time period between the first and second instances of CSI). Based on the assumption that the channel state of channel 106(A) will change consistently over time, the AP 102 is able to predict the state of the channel at a future point in time. In the specific example, the AP 102 is able to predict the state of the channel 106(a) as the receive antenna 107(a) continues to move or re-locate. As such, the precoding matrix for a subsequent data transmission can be updated to reflect the predicted channel state at a future point in time, e.g., a forward-predictive precoding matrix can be determined.

The following provides a mathematical example of determining a forward-predictive precoding matrix utilizing extrapolation of CSI. Consider the situation where the first CSI, e.g., $CSI_1$, is obtained at time $t_1$ and the second CSI, e.g., $CSI_2$, is obtained at a time $t_2$. In this specific example, the first CSI may be in a form of a first channel state matrix and the second CSI may be in the form of a second channel state matrix.

For $t > t_2$, first continuously compute via extrapolation:

$$CSI_t = CSI_2 + (CSI_2 - CSI_2) * \frac{t - t_2}{t_2 - t_1}, \qquad \text{Eq. (1)}$$

wherein $CSI_t$ is a forward-predictive channel state matrix.

Then form a Forward-Predictive Precoding matrix, e.g., FPPM, at time t as:

$$FPPM_t = f(CSI_t), \qquad \text{Eq. (2)}$$

where f( ) indicates a precoding matrix calculation to yield the forward-predictive precoding matrix.

In another embodiment, dependent upon the nature of the sounding feedback, the CSI can be applied directly to the precoding matrix presuming the appropriate differentials can be derived from the sounding feedback. For example, in the other embodiment that follows path B of method 200, at stage 250, the method includes determining a first precoding matrix based on the first CSI (in certain examples, this determination is performed immediately after receiving the first CSI) and determining a second precoding matrix based on the second CSI (in certain examples, this determination is performed immediately after receiving the second CSI) with the second precoding matrix indicating a change in the state of the channel from the state of the channel at the first time. At stage 255, based on the first and second precoding matrices, a forward-predictive precoding matrix is determined that reflects a state of the channel at a future time and is consistent with the change in the state of the channel over a time period between the first and second time. Path B of method 200 is computationally more resourceful than that of path A, as the computational stage 230 of determining a forward-predictive channel state matrix is eliminated.

Mathematically, with respect to path B, consider the situation where a first precoding matrix, e.g., $PM_1$, is derived from the first CSI at time $t_1$ and a second precoding matrix, e.g., $PM_2$, is derived from the second CSI at time $t_2$, see Equations 3 and 4.

$$PM_1 = f(CSI_1), \qquad \text{Eq. (3)}$$

where f( ) indicates the precoding matrix calculation to yield the first precoding matrix.

$$PM_2 = f(CSI_2), \qquad \text{Eq. (4)}$$

where f( ) indicates the precoding matrix calculation to yield the second precoding matrix.

For t>$t_2$, instead of extrapolating to obtain $CSI_t$, directly extrapolate the precoding matrix to obtain the FPPM at time t as:

$$FPPM_t = PM_2 + (PM_2 - PM_1) * \left(\frac{t - t_2}{t_2 - t_1}\right). \quad \text{Eq. (5)}$$

Figure 4:
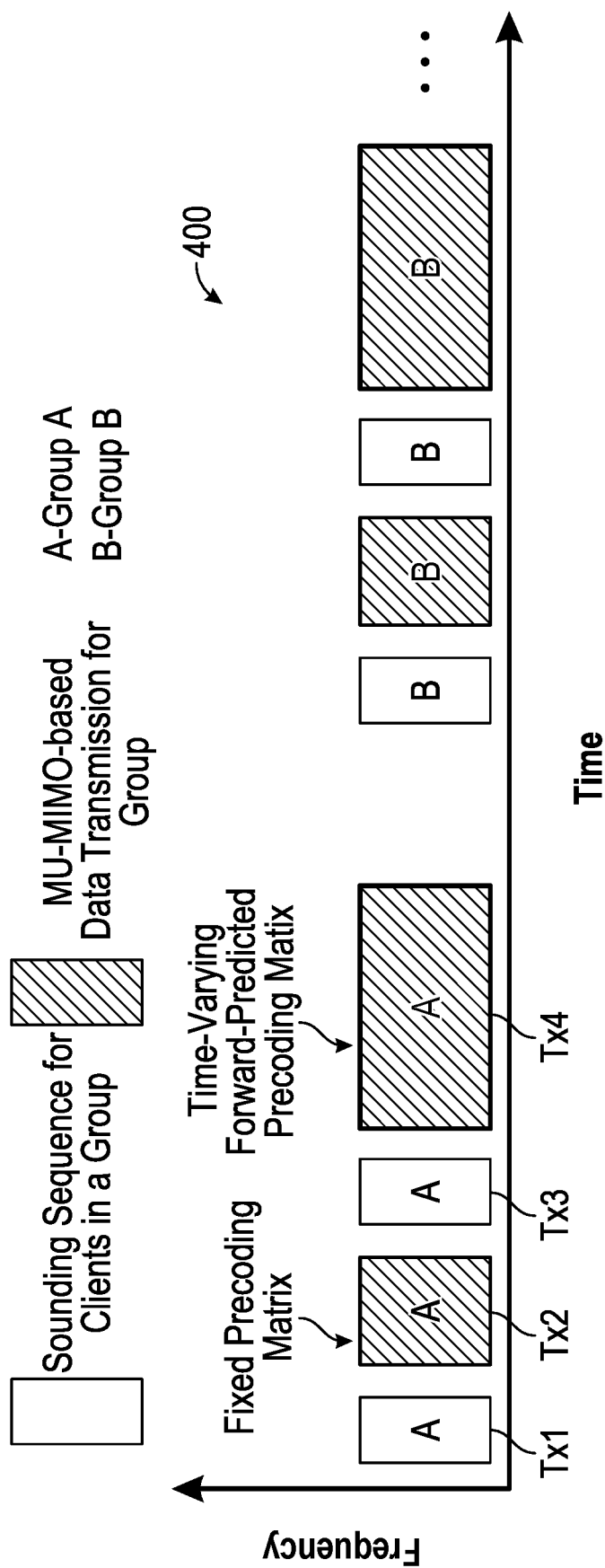
FIG. 4 illustrates an exemplary transmission sequence for use with forward-predictive precoding matrices.

It should be noted that either of the two embodiments, e.g., represented by path A and path B of method 200, for determining a forward-predictive precoding matrix can be applied to the transmission sequence of FIG. 4 (described further herein). Additionally, it should be noted that either of the two embodiments for determining a forward-predictive precoding matrix can be applied to the transmission sequence of FIG. 5 (described further herein), however, rather than continuously recomputing the precoding matrix, the recomputation is performed only at discrete points.

Figure 3A:
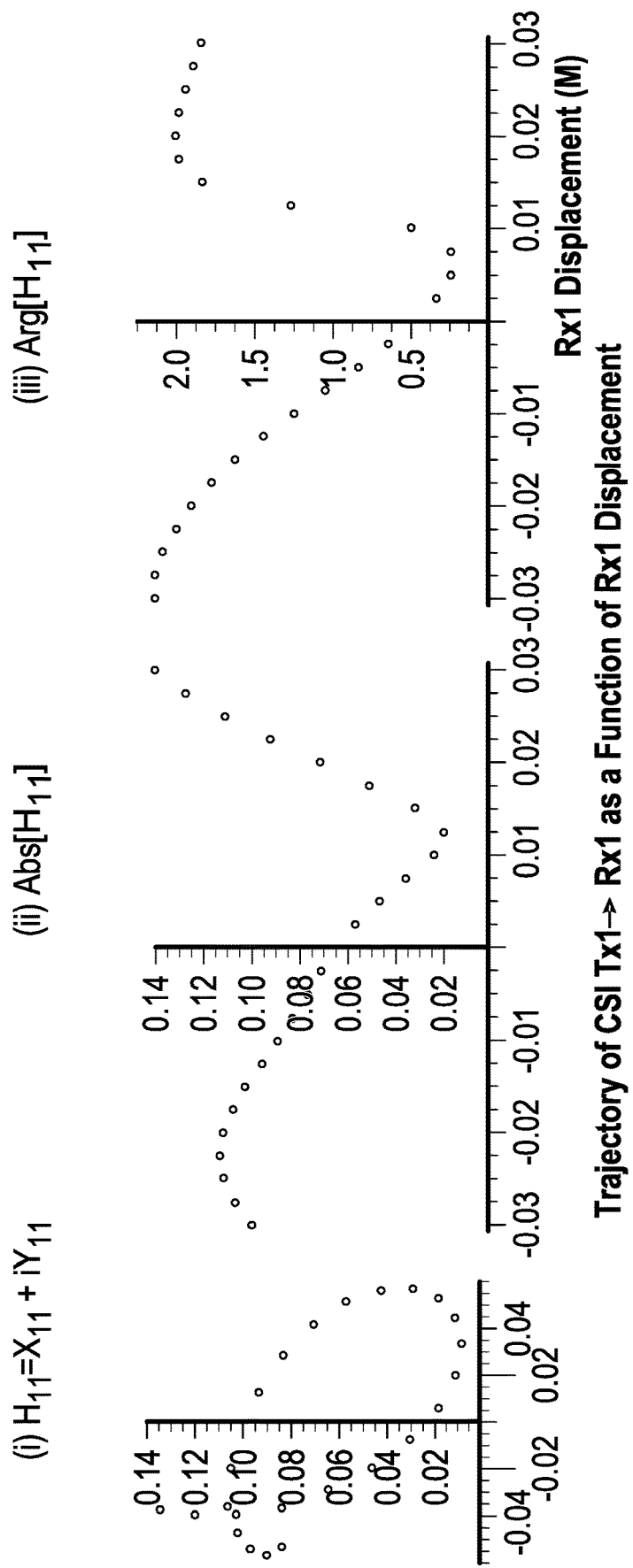
FIGS. 3(A) and 3(B) are plots illustrating changes in Transmitter to Receiver Channel State Information (CSI) for small displacements of the Receiver in a fixed space.
Figure 3B:
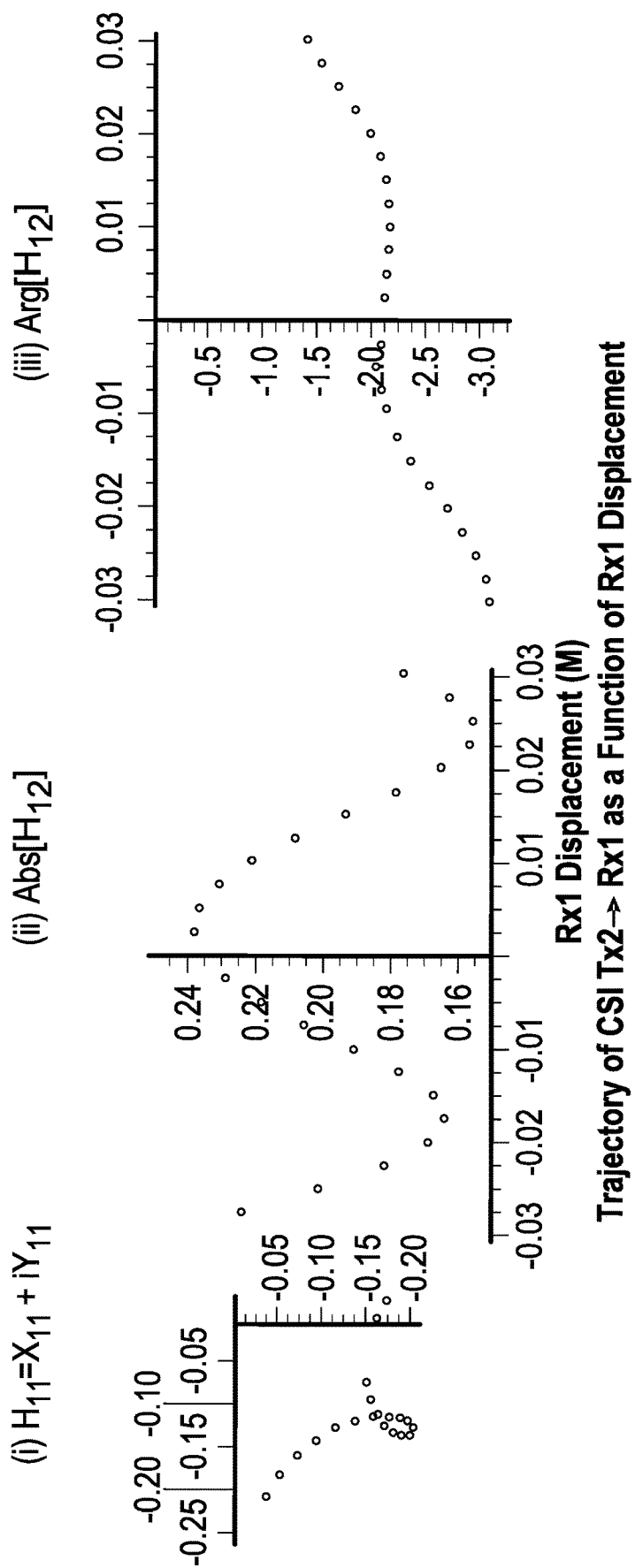

To explain further, reference is made to the examples provided in the plots of FIGS. 3(A) and 3(B). As shown, FIGS. 3(A) and 3(B) illustrate the variation of two of the H-matrix elements, in this instance the H-Matrix elements generally correspond to or are included within the CSI, as a function of the location and displacement of Tx-Rx antenna pairs, e.g., Tx=antenna 105(a) of AP 102–Rx=antenna 107(a) of client device 104(a). The plots illustrate propagation characteristics for a 6×6 MIMO system deployed in an 8 m×10 m×5 m room via simulation. The six Tx antenna elements are arranged in a linear array with 20 cm inter-element spacing. Points are plotted for displacements of 2.5 mm. The plots show the trajectory of the complex CSI matrix element in either complex rectangular coordinates (2.5 mm displacement per point) or in complex polar coordinates (Mag, Arg) as a function of displacement. At typical (maximum) indoor velocity of 1 m/sec, any sequence of 3 points would bound a possible trajectory of the CSI matrix element during a 5 msec frame transmission. With knowledge of the derivatives of the matrix elements at the start of each frame, the Tx node (e.g., AP 102) can calculate values for each forward-predictive precoding matrix element during the frame interval and update the precoding matrix at appropriate intervals.

In FIGS. 3(A) and 3(B) a linear fit provides a sufficient extrapolation for forward-predictive precoding updates over the illustrated range. While linear extrapolation is suitable in the provided examples, a polynomial extrapolation or other non-linear methods (e.g., matrix inversion, zero-forcing, etc.) may alternatively be used. Note that the derivative of the matrix elements for a Rx node whose position is static will be 0 so the forward-predictive precoding matrix column for that node will not be affected by the update process. As such, method 200 implicitly handles any mix of fixed and position-changing Rx nodes.

Returning to the flowchart of FIG. 2, at stage 240, the forward-predictive precoding matrix determined by AP 102 at either stage 235 if path A of method 200 is followed or stage 255 if path B of method 200 is followed is applied to a data transmission. The forward-predictive precoding matrix will accommodate the change in the state of the channel 106(a) so that the data transmission is received at receive antenna 107(a) with minimal or no SIR degradation. In the specific example, the forward-predictive precoding matrix will direct the data transmission from antenna 105(a) of AP 102 to receive antenna 107(a) of client device 104(a) at a location that is different from a location to which the data transmission would have been directed if the precoding matrix had been based on a single instance of CSI, e.g., the motion of the receive antenna 107(a) has been accommodated. The method 200 ends at stage 245. It has been found that the method 200 is well-suited to future-predictive precoding matrices for future times of 5 msec to 10 msec however the method 200 is not so limited in that use of the method 200 for future times greater than 10 msec or less than 5 msec is also possible.

It should be noted that, while differences in first and second soundings can be used to detect a change in state of a communication channel between a transmit antenna of an AP and a receive antenna of a client device other manners are also possible for detecting a change in state of the communication channel. For example, a bad transmission to a client or a re-transmission (re-Tx) to a client can indicate that a change in state of the communication channel has occurred. Additionally, detected CSI changes from first and second soundings or re-transmissions to the client may result in a modification of channel sounding time or periodicity. Regardless of the manner of detecting a change in state of the communication, method 200 can be performed to accommodate for the change in state of the communication channel.

It should be further noted that, while utilizing the forward-predictive precoding matrix obtained under method 200 is an effective manner of mitigating the effect of a change in state of the communication channel, other manners of mitigating the effect of a change in state of the communication channel are also possible. For example, instead of utilizing a forward-predictive precoding matrix, a precoding matrix based solely on a most recent sounding can be applied to a reduced/shortened data frame, which is chosen based on motion such that the SIR is sufficient for a chosen modulation coding scheme. In another example, instead of utilizing a forward-predictive precoding matrix, more robust transmission parameters (e.g., a reduced number of spatial streams, a modulation coding stream) can be chosen given the amount of changes in the state of the communication channel.

Other modifications to the method 200 can include, for example, optimizing sounding by sensing re-transmission or packet loss and, responsively, enabling adaptive polling/sounding to enable prediction with existing clients without impacting AP or client standards. Alternatively, the client device can be cooperatively involved through use of an application or through use of standards changes. For example, the client device can alert the AP that the client device is moving (e.g., the client device detects its own motion via an accelerometer and, correspondingly, alerts that AP). This notification of motion from the client device to the AP helps to save the extra overhead required for detecting channel change from sounding. Further, the client device can inform the AP of its motion trajectory and the AP can update the precoding matrix, independent of sounding, based on the client device's reported motion.

FIG. 4 illustrates an exemplary transmission sequence 400 for use with forward-predictive precoding matrices. As shown, the transmission sequence 400 performs at least two closely spaced sounding sequences of approximately 1 msec-2 msec by sandwiching a short data packet (e.g., less than 5 msec in length) in between to obtain a pair of CSI measures from all clients in a group, e.g., Group A. The forward-predictive method 200, providing extrapolation over time, is used by AP 102 to continuously update the forward-predictive precoding matrix for transmitting a subsequent long data frame (e.g., 5 msec to 10 msec in length) to antenna 107(a) of client device 104(a). For example, the forward-predictive matrix can occur on a per-symbol basis such that each symbol in the long data frame is updated with a forward-predictive precoding matrix that corresponds to the time-position of the symbol in the long data frame. In another example, the forward-predictive matrix can occur on a symbol group basis such that each of a group of a plurality of symbols in the long data frame is updated with a forward-predictive precoding matrix that corresponds to the time-position of the group in the long data frame. As such, the first sequence illustrated in FIG. 4 includes: (a) Tx1 representative of a first sounding sequence with clients in Group A; (b) Tx2 representative of a first data transmission wherein a fixed precoding matrix (e.g., a non-forward-predictive precoding matrix) based solely on the first sounding sequence is applied to the transmission; (c) Tx3 representative of a second sounding sequence with clients in Group A; and (d) Tx4 representative of a data transmission with a time varying forward-predictive precoding matrix that occurs on a symbol-by-symbol basis within the data frame. In another transmission sequence, the forward-predictive precoding matrix is constant over a full frame duration for a data transmission at Tx4.

Figure 5:
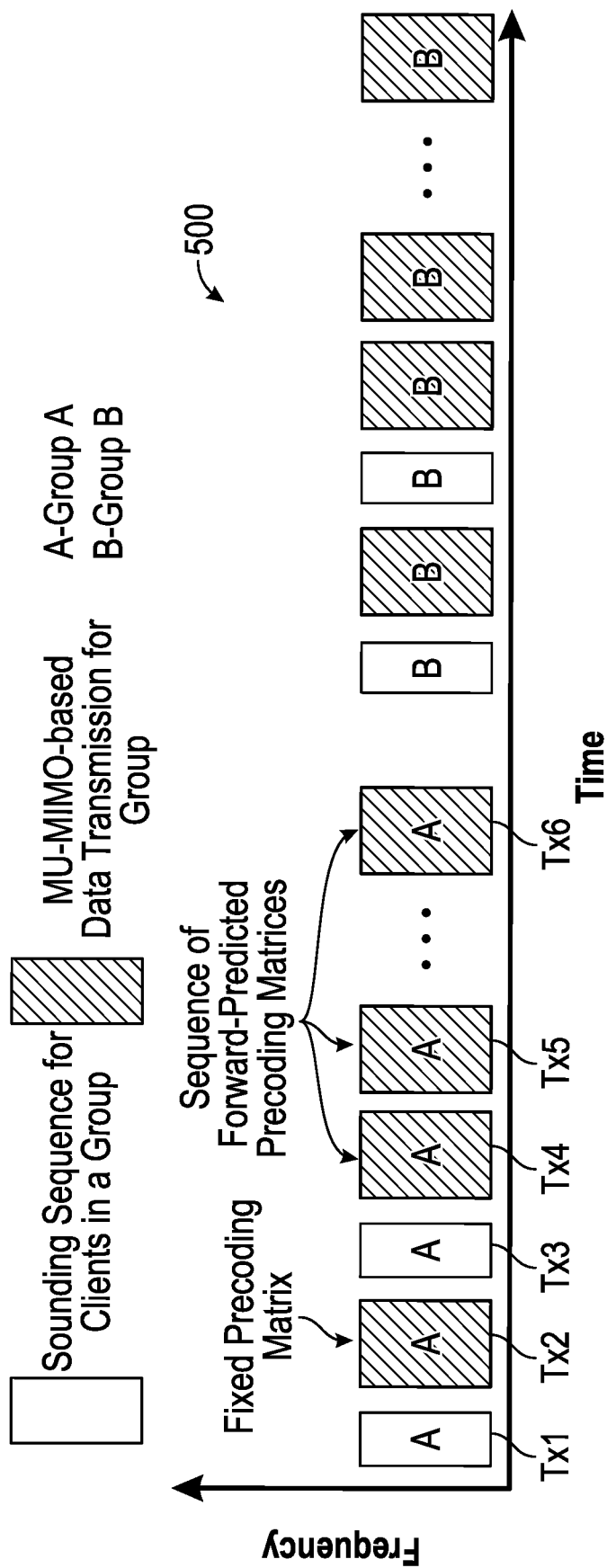
FIG. 5 illustrates an exemplary transmission sequence for use with forward-predictive precoding matrices.

FIG. 5 illustrates an exemplary transmission sequence 500 for use with forward-predictive precoding matrices. As shown, the transmission sequence 500 performs at least two closely-spaced sounding sequences of approximately 1 msec-2 msec by sandwiching a short data packet (e.g., less than 5 msec in length) in between to obtain a pair of CSI measures from all clients in a group, e.g., Group A. The forward-predictive method 200, providing extrapolation over time, is used to continuously update the forward-predictive precoding matrix for each of a sequence of short data frames, e.g., each short data frame having a different forward-predictive precoding matrix that accommodates the unique discrete time-position of the short data frame. As such, the first sequence illustrated in FIG. 5 includes: (a) Tx1 representative of a first sounding sequence with clients in Group A; (b) Tx2 representative of a first data transmission wherein a fixed precoding matrix (e.g., a non-forward-predictive precoding matrix) based solely on the first sounding sequence is applied to the transmission; (c) Tx3 representative of a second sounding sequence with clients in Group A; (d) Tx4 representative of a shortened data frame data transmission with a first forward-predictive precoding matrix based on the first and second soundings of Tx1 and Tx3; (e) Tx5 representative of a shortened data frame data transmission with a second forward-predictive precoding matrix, different from the first forward-predictive precoding matrix due to the later time of transmission of Tx5 relative to Tx4; and (f) Tx5 representative of a shortened data frame data transmission with a third forward-predictive precoding matrix, different from both the first and second forward-predictive precoding matrices due to the later time of transmission of Tx6 relative to Tx4 and Tx5.

Figure 6A:
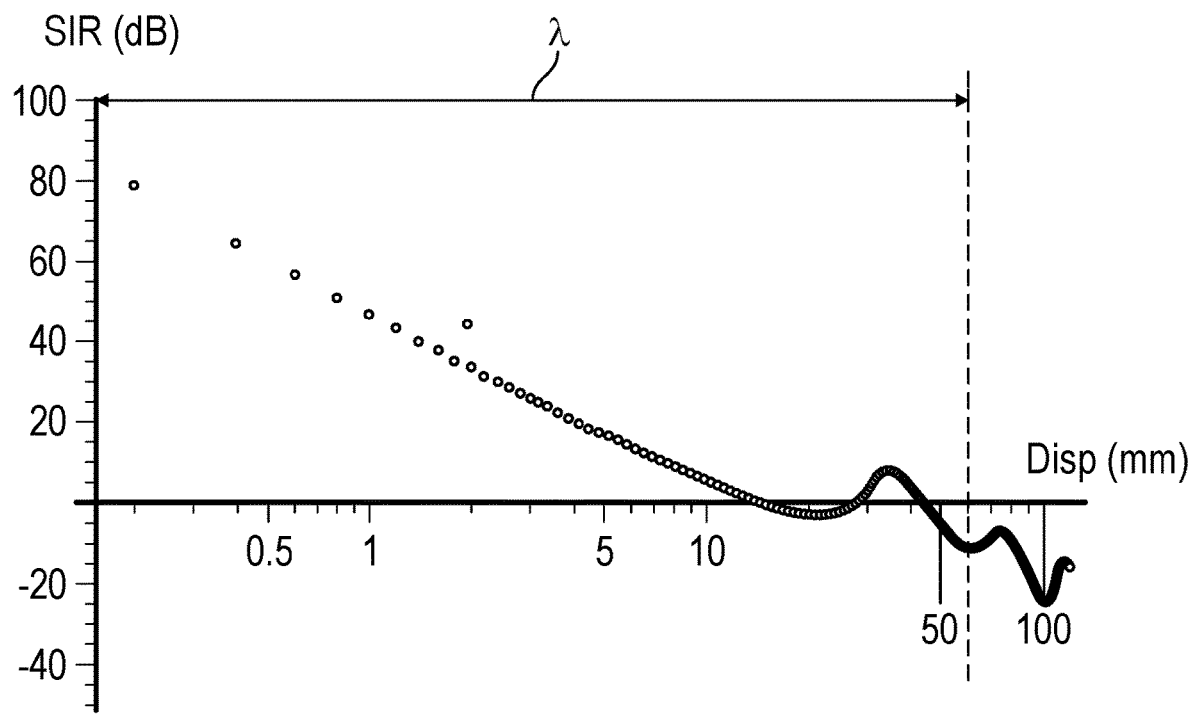
FIGS. 6(A)-6(B) are plots illustrating a reduction in Signal-to-Interference Ratio (SIR) degradation by implementing forward-predictive precoding matrices.
Figure 6B:
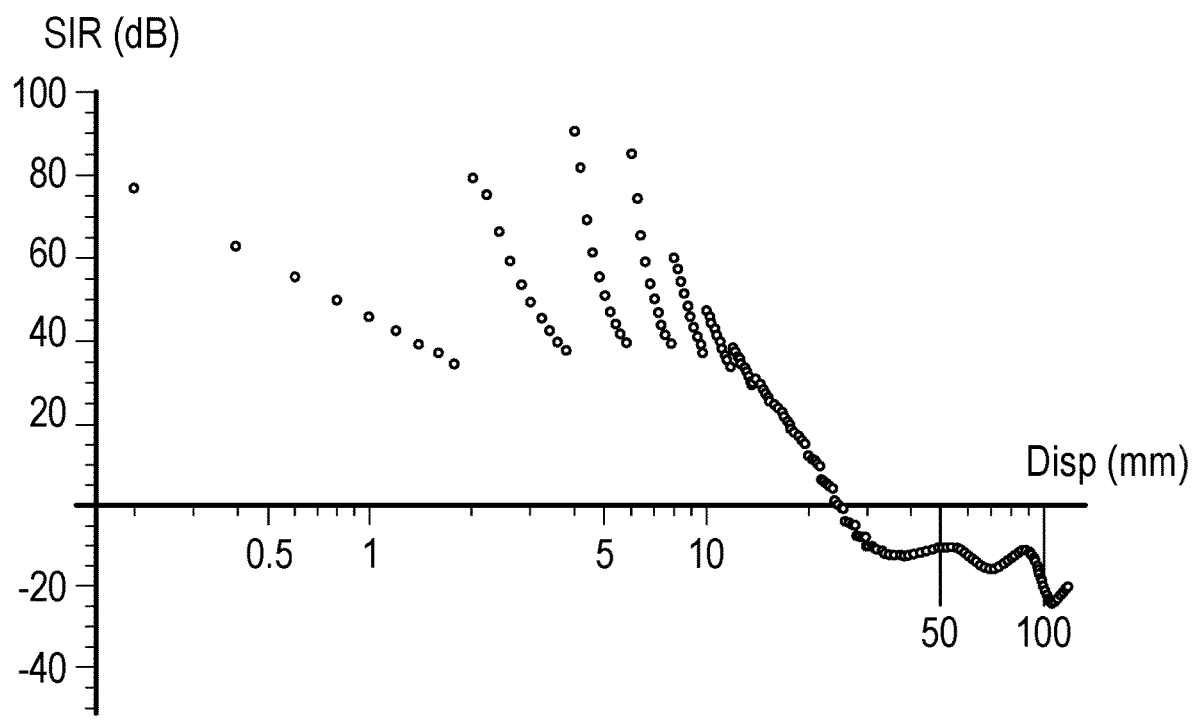

FIGS. 6(A) and 6(B) illustrate the reduction in SIR degradation through implementation of method 200 and the forward-predictive precoding matrix. FIG. 6(A) is a plot illustrating change in SIR for precoded MIMO (e.g., the MIMO data transmission being precoded with a precoding matrix that is based only a most recent sounding) as a receive antenna is displaced from an original position in an indoor multipath scenario. Note that given velocities of typical indoor environments, a receive antenna may displace 1 mm every msec. As such, over the course of a 5 msec data frame reception, the receive antenna may displace by 5 mm causing the SIR to diminish several orders of magnitude. The significant decrease in SIR can exceed the coding capability of a selected modulation coding stream and lead to a frame decoding failure. FIG. 6(B) is a plot illustrating SIR performance using method 200 and the forward-predictive precoding matrix on a MIMO data transmission. In the illustrated plot, the forward-predictive precoding matrix was calculated using matrix inversion based on channel reciprocity. The configuration is the same as that shown in FIG. 6(A) so that the FIG. 6(B) is directly comparable to FIG. 6(A). However, in the instance of FIG. 6(B), the forward-predictive precoding matrix is periodically updated, with the update occurring at a fixed interval of 2.5 msec. It can be seen that while the precoding matrix is held constant, the SIR degrades as shown in FIG. 6(A). However, when the precoding matrix is updated as in FIG. 6(B), the SIR jumps to a higher value from which it descends until the next update. The process continues until the extrapolation no longer provides an adequate estimate of the channel matrix elements.

In view of the present disclosure it can be appreciated that method 200 for future-predictive pre-coding MU-MIMO data transmissions in a wireless environment provides precoded MIMO immunity to receive antenna motion for typical indoor environments. Further, method 200 can continuously adapt the forward-predictive precoding matrix after CSI sounding measurements to improve SIR and achieve higher throughput with fewer transmissions. Further still, the method 200 does not require any modifications to the receiving device, e.g., client device 104(a). The method 200 may be particularly beneficial in applications where the receive antenna is subject to a predictably repetitive or periodic motion, as determined from CSI of greater than two soundings, such as in the instance of a robotic device hosting a receive antenna where the robotic device moves in a repeating pattern about a space to perform designated tasks.

Figure 7:
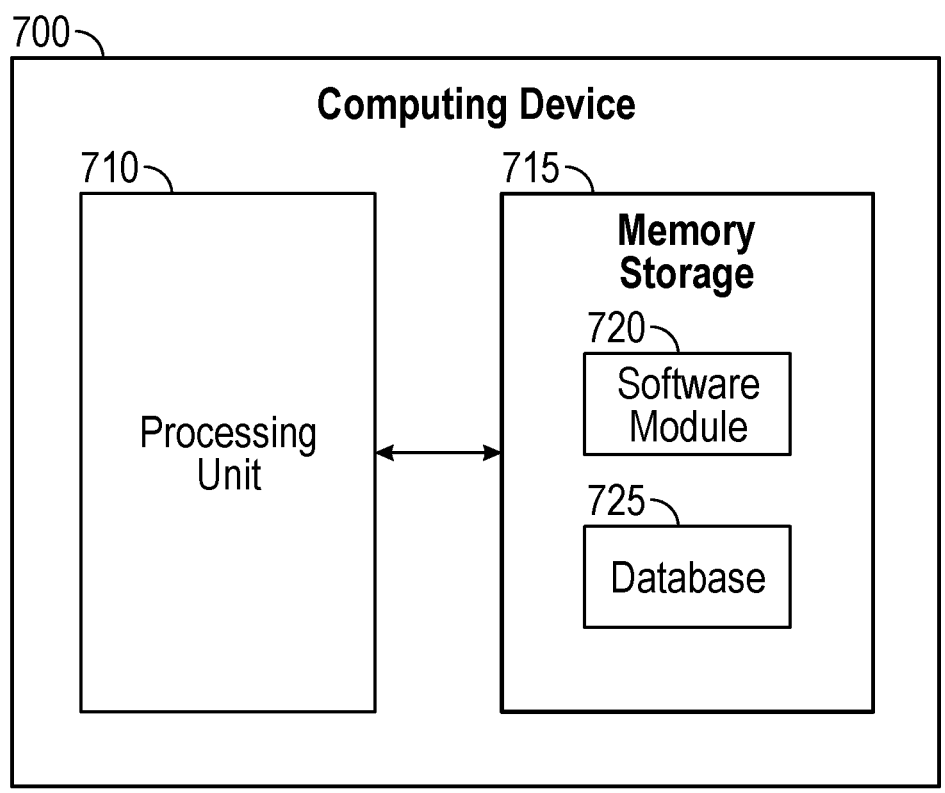
FIG. 7 is a block diagram of a computing device.

FIG. 7 shows computing device 700. As shown in FIG. 7, computing device 700 may include a processing unit 710 and a memory unit 715. Memory unit 715 may include a software module 720, and software database 725, and additional logic. While executing on processing unit 710, software module 720 may perform, for example, processes for providing channel sounding using a dedicated sounding link as described herein. Computing device 700, for example, may provide an operating environment for AP 102, client devices 104, etc. Other operational environments may be utilized, and the present disclosure is not limited to computing device 700.

Computing device 700 may be implemented using a Wi-Fi access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 700 may comprise any computer operating environment, such as hand-held devices, multiprocessor systems, microprocessor-based or programmable sender electronic devices, minicomputers, mainframe computers, and the like. Computing device 700 may also be practiced in distributed computing environments where tasks are performed by remote processing devices. The aforementioned systems and devices are examples and computing device 700 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where elements may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 700 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
    establishing a wireless communication with a receive antenna of a client device over a channel;
    performing a first sounding to the receive antenna;
    responsive to the first sounding, receiving first channel state information (CSI) from the client device at a first time;
    performing a second sounding to the receive antenna;
    responsive to the second sounding, receiving second CSI from the client device at a second time;
    based on the first CSI and the second CSI, determining a change in a state of the channel over a time period between the first time and the second time;
    based on the change in the state of the channel, determining a forward-predictive channel state matrix, wherein the forward-predictive channel state matrix comprises the state of the channel at a future time and is consistent with the determined change in the state of the channel over the time period between the first time of the first sounding and the second time of the second sounding;
    based on the forward-predictive channel state matrix, determining a forward-predictive precoding matrix, wherein the forward-predictive precoding matrix comprises the state of the channel at the future time and is consistent with the determined change in the state of the channel over the time period between the first time of the first sounding and the second time of the second sounding; and
    applying the forward-predictive precoding matrix to a data transmission transmitted to the receive antenna of the client device after the second time.

2. The method of claim 1, wherein a data transmission with a non-forward predictive precoding matrix occurs between the performing of the first and second soundings.

3. The method of claim 1, wherein determining the forward-predictive precoding matrix includes determining a new forward-predictive precoding matrix for:
    each of a plurality of symbols in the data transmission;
    a group of the plurality of symbols in the data transmission; or
    a sequence of short data frames; and wherein applying the forward-predictive precoding matrix to the data transmission includes correspondingly applying the new forward-predictive precoding matrix to:
each of the plurality of symbols in the data transmission;
the group of the plurality of symbols in the data transmission; or
the sequence of short data frames.

4. The method of claim 1, wherein determining the change in the state of the channel over the time period between the first and second time includes linear extrapolation of the first and second CSI.

5. The method of claim 1, further comprising performing an additional sounding and, responsive to the additional sounding, receiving an additional CSI from the client device and, based on the first CSI, second CSI and additional CSI, determining the change in the state of the channel.

6. The method of claim 5, wherein determining the change in the state of the channel includes non-linear extrapolation.

7. The method of claim 6, wherein determining the change in the state of the channel includes determining that the change in the state of the channel comprises a repeating pattern.

8. The method of claim 1, further comprising optimizing sounding by sensing a re-transmission of a data transmission to the client device or sensing a packet loss in the data transmission to the client device and, responsively, performing adaptive sounding to the client device to accommodate the re-transmission or packet loss.

9. The method of claim 1, further comprising:
receiving an alert from the client device that the client device is in motion;
receiving information from the client device identifying a motion trajectory of the client device; and
updating the forward-predictive precoding matrix based on the motion trajectory,
independent of a subsequent sounding.

10. A method comprising:
establishing a wireless communication with a receive antenna of a client device over a channel;
performing a first sounding to the receive antenna;
responsive to the first sounding, receiving first channel state information (CSI) from the client device at a first time;
based on the first CSI, determining a first precoding matrix;
performing a second sounding to the receive antenna;
responsive to the second sounding, receiving second CSI from the client device at a second time;
based on the second CSI, determining a second precoding matrix, the second precoding matrix indicating a change in a state of the channel from the state of the channel at the first time of the first sounding to the second time of the second sounding;
based on the first and second precoding matrices, determining a forward-predictive precoding matrix, wherein the forward-predictive precoding matrix comprises a state of the channel at a future time and is consistent with the change in the state of the channel over a time period between the first time of the first sounding and the second time of the second sounding; and
applying the forward-predictive precoding matrix to a data transmission transmitted to the receive antenna of the client device after the second time.

11. The method of claim 10, wherein a data transmission with a non-forward predictive precoding matrix occurs between the performing of the first and second soundings.

12. The method of claim 10, wherein determining the forward-predictive precoding matrix includes determining a new forward-predictive precoding matrix for:
each of a plurality of symbols in the data transmission;
a group of the plurality of symbols in the data transmission; or
a sequence of short data frames; and
wherein applying the forward-predictive precoding matrix to the data transmission includes correspondingly applying the new forward-predictive precoding matrix to:
each of the plurality of symbols in the data transmission;
the group of the plurality of symbols in the data transmission; or
the sequence of short data frames.

13. The method of claim 10, wherein determining the forward-predictive precoding matrix includes linear extrapolation of the first and second precoding matrices.

14. The method of claim 10, further comprising performing an additional sounding at a third time and, responsive to the additional sounding:
receiving an additional CSI from the client device;
based on the additional CSI, determining a third precoding matrix indicating a new change in the state of the channel from the state of the channel at the second time; and
determining the forward-predictive precoding matrix based on the first precoding matrix, the second precoding matrix, and the third precoding matrix.

15. The method of claim 14, wherein determining the forward-predictive precoding matrix includes non-linear extrapolation.

16. The method of claim 15, further comprising determining that the change in the state of the channel and the new change in the state of the channel comprise a repeating pattern.

17. The method of claim 10, further comprising optimizing sounding by sensing a re-transmission of a data transmission to the client device or sensing a packet loss in the data transmission to the client device and, responsively, performing adaptive sounding to the client device to accommodate the re-transmission or packet loss.

18. The method of claim 10, further comprising:
receiving an alert from the client device that the client device is in motion;
receiving information from the client device identifying a motion trajectory of the client device; and
updating the forward-predictive precoding matrix based on the motion trajectory, independent of a subsequent sounding.

19. An apparatus comprising:
a memory storage; and
a processing unit coupled to the memory storage, wherein the processing unit is operative to:
establish a wireless communication with a receive antenna of a client device over a channel;
perform a first sounding to the receive antenna;
responsive to the first sounding, receive first channel state information (CSI) from the client device at a first time;
based on the first CSI, determine a first precoding matrix;
perform at least a second sounding to the receive antenna;
responsive to the second sounding, receive second CSI from the client device at a second time;

based on the second CSI, determine a second precoding matrix, the second precoding matrix indicating a change in a state of the channel from the state of the channel at the first time of the first sounding to the second time of the second sounding;

based on the first and second precoding matrices, determine a forward-predictive precoding matrix, wherein the forward-predictive precoding matrix comprises a state of the channel at a future time and is consistent with the change in the state of the channel over a time period between the first time of the first sounding and the second time of the second sounding; and apply the forward-predictive precoding matrix to a data transmission transmitted to the receive antenna of the client device after the second time.

20. The apparatus of claim 19, wherein the determination of the forward-predictive precoding matrix includes extrapolation of the first and second precoding matrices.

* * * * *